(12) United States Patent
Song

(10) Patent No.: US 9,954,258 B2
(45) Date of Patent: Apr. 24, 2018

(54) MANUFACTURING METHOD OF HIGH PURITY MANGANESE SULPHATE FROM THE WASTE LIQUID OF BATTERY RECYCLING PROCESS

(71) Applicant: KANGWON NATIONAL UNIVERSITY University-Industry Cooperation Foundation, Gangwon-do (KR)

(72) Inventor: Young Jun Song, Gangwon-do (KR)

(73) Assignee: KANGWON NATIONAL UNIVERSITY University-Industry Cooperation Foundation, Gangwon-Do (KR)

( * ) Notice: Subject to any disclaimer, the term of this patent is extended or adjusted under 35 U.S.C. 154(b) by 19 days.

(21) Appl. No.: 15/240,828

(22) Filed: Aug. 18, 2016

(65) Prior Publication Data

US 2017/0084966 A1    Mar. 23, 2017

(30) Foreign Application Priority Data

Sep. 18, 2015    (KR) .......................... 10-2015-0132348

(51) Int. Cl.
  *H01M 10/54*    (2006.01)
  *C01F 11/46*    (2006.01)
  (Continued)

(52) U.S. Cl.
  CPC .............. *H01M 10/54* (2013.01); *C01F 7/02* (2013.01); *C01F 11/462* (2013.01); *C01G 3/12* (2013.01);
  (Continued)

(58) Field of Classification Search
  None
  See application file for complete search history.

(56) References Cited

U.S. PATENT DOCUMENTS 4,992,149 A * 2/1991 Nguyen .................... C25B 1/21
                                                     205/540
2013/0312254 A1 * 11/2013 Kim ...................... C01D 15/08
                                                     29/623.1

FOREIGN PATENT DOCUMENTS

BE            883455    *  5/1980
CN       103342390 A     10/2013
(Continued)

OTHER PUBLICATIONS

Chinese Office Action dated Jul. 28, 2017, issued in Chinese Patent Application No. 2016106338801.X.

*Primary Examiner* — Sheng H Davis
(74) *Attorney, Agent, or Firm* — Harness, Dickey & Pierce, P.L.C.

(57) ABSTRACT

Provided is a method of manufacturing high-purity, high-quality manganese sulfate which can be immediately used for manufacturing a lithium ion secondary battery from manganese sulfate waste liquid of a wasted battery. Since impurities are removed from the manganese sulfate waste liquid by using sulfides causing no secondary contamination in the manganese sulfate waste liquid and the manganese sulfate is manufactured by performing evaporation concentration through heating, the manufacturing method is very environment-friendly and economical. Since the manganese recovering process improving the manufacturing yield of the manganese sulfate and the waste water treatment process capable of recycling the source materials and discharging waste water are integrated, the manufacturing method is very efficient and environment-friendly. The manufacturing method is applied to the recycling industry, and thus, it is possible to obtain effects of preventing environmental pollution and facilitating recycling the resources.

12 Claims, 1 Drawing Sheet

(51) Int. Cl.
  *H01M 10/0525* (2010.01)
  *C01G 45/10* (2006.01)
  *C22B 47/00* (2006.01)
  *C02F 9/00* (2006.01)
  *C01G 45/00* (2006.01)
  *C01G 51/00* (2006.01)
  *C01G 53/11* (2006.01)
  *C01G 3/12* (2006.01)
  *C01G 9/08* (2006.01)
  *C22B 7/00* (2006.01)
  *C01F 7/02* (2006.01)
  *C02F 1/26* (2006.01)
  *C02F 1/66* (2006.01)
  *C02F 103/34* (2006.01)
  *C02F 101/20* (2006.01)
  *C02F 1/28* (2006.01)
  *C02F 1/52* (2006.01)
  *C02F 101/10* (2006.01)

(52) U.S. Cl.
  CPC .............. *C01G 9/08* (2013.01); *C01G 45/00* (2013.01); *C01G 45/10* (2013.01); *C01G 51/30* (2013.01); *C01G 53/11* (2013.01); *C02F 9/00* (2013.01); *C22B 7/006* (2013.01); *C22B 47/00* (2013.01); *H01M 10/0525* (2013.01); *C01P 2006/80* (2013.01); *C02F 1/26* (2013.01); *C02F 1/283* (2013.01); *C02F 1/5236* (2013.01); *C02F 1/66* (2013.01); *C02F 2101/101* (2013.01); *C02F 2101/206* (2013.01); *C02F 2103/34* (2013.01); *C02F 2209/02* (2013.01); *Y02P 10/234* (2015.11); *Y02W 30/84* (2015.05)

(56) References Cited

FOREIGN PATENT DOCUMENTS

| CN | 103342390 | * | 4/2015 |
| JP | 2013112859 | * | 6/2013 |
| JP | 203683269 | * | 7/2014 |
| KR | 10-1542747 |   | 8/2015 |

* cited by examiner

MANUFACTURING METHOD OF HIGH PURITY MANGANESE SULPHATE FROM THE WASTE LIQUID OF BATTERY RECYCLING PROCESS

CROSS-REFERENCE TO RELATED PATENT APPLICATION

This application claims the benefit of Korean Patent Application No. 10-2015-0132348, filed on Sep. 18, 2015 in the Korean Intellectual Property Office, the disclosure of which is incorporated herein in its entirety by reference.

FIELD

The present disclosure relates to a method of manufacturing high-purity manganese sulfate from manganese sulfate waste liquid generated in a process of recovering metals from a wasted battery or constituents of the wasted battery.

BACKGROUND

With the wide spread of mobile devices, the demands for secondary batteries have rapidly increased. Lithium ion secondary batteries having changeability in high energy density design cover most of the secondary battery market. The lithium ion secondary battery as a consumable part can be charged and discharged about 500 times and has a lifecycle of about six months to two years. Since a used lithium ion secondary battery includes a large amount of valuable metals such as lithium (Li) and cobalt (Co), and thus, the used lithium ion secondary batteries are recyclable resources having large economic values. By breaking the used lithium ion secondary battery for recycling, coarse grain including mainly aluminum (Al), gold (Au), copper (Cu), plastic, and the like and fine grain including mainly lithium, cobalt, nickel (Ni), manganese (Mn), and the like can be obtained. Korea is the world's second-largest consuming country for cathode material as a main constituent of the lithium ion secondary battery. Since a most amount of the cathode materials in Korea is dependent on import, recycling of the cathode materials by using the wasted battery has greatly drawn national interest. As a method of recycling the cathode materials, there is a solvent extraction method of dissolving the aforementioned fine grain of the wasted battery in a solvent and separating the fine grain with an extracting solution, and recovering highly-valuable cobalt and nickel among metals constituting the cathode materials. As a representative solvent extraction method, there is an extraction method using phosphoric acid series solvent. However, the extraction method using the phosphoric acid series solvent has problems of environmental pollution caused by the phosphoric acid series solvent, environmental pollution caused by manganese sulfate waste liquid containing manganese, copper, aluminum, calcium (Ca), sodium (Na), or the like discarded in the extraction process, and enormous cost for treating these materials. However, since the manganese sulfate waste liquid contains manganese sulfate, the manganese sulfate waste liquid may be good recyclable resources. If the manganese sulfate as a manganese oxide has a high purity, the manganese sulfate can be immediately used as a cathode material of the lithium ion secondary battery. However, most amount of the manganese sulfate used for manufacturing the secondary battery is also dependent on import. Therefore, if the manganese sulfate existing in the manganese sulfate waste liquid discarded in the wasted battery recycling process is recycled, the effects are expected in that a cost of treating waste water of the manganese sulfate waste liquid is expected to be saved and import substitution effect for the manganese sulfate is expected.

Patent Documents and reference documents disclosed in the specification are incorporated into the specification by reference to the same degree that the documents are individually and clearly specified.

Patent Document 1: Korean Patent No. 10-1542747

SUMMARY

The inventors studied a method of recycling manganese sulfate waste liquid generated in a process of recovering cobalt and nickel from wasted batteries or constituents of the wasted batteries. The inventors found from the results of the study and experiments that high-purity, high-quality manganese sulfate was able to be manufactured by adjusting solubility and crystal growth characteristics of various materials existing in the waste liquid, and thus, the invention was achieved.

The invention provides a method of manufacturing high-purity manganese sulfate from manganese sulfate waste liquid of a wasted battery.

Other objects and technical features will be disclosed more specifically by the detailed description, the claims, and the drawings.

According to an aspect of the invention, there is provided a method of manufacturing high-purity manganese sulfate from manganese sulfate waste liquid of a wasted battery including steps of:

(a) producing manganese sulfate waste liquid from which an organic materials is removed by allowing the manganese sulfate waste liquid generated in a recycling process of the wasted battery to pass through active carbon;

(b) adjusting pH of the organic-material-removed manganese sulfate waste liquid to be in a range of 4 to 7;

(c) performing first solid liquid separation on the manganese sulfate waste liquid of which pH is adjusted to be in a range of 4 to 7 to separate first manganese sulfate filtrated liquid and first solid;

(d) performing first evaporation concentration on the first manganese sulfate filtrated liquid in a temperature range of 90 to 100° C. to produce first manganese sulfate concentrated liquid;

(e) cooling the first manganese sulfate concentrated liquid down to a temperature range of 40 to 60° C. and performing second solid liquid separation to separate second manganese sulfate filtrated liquid and second solid;

(f) performing second evaporation concentration on the second manganese sulfate filtrated liquid in a temperature range of 90 to 100° C. to produce second manganese sulfate concentrated liquid;

(g) performing third solid liquid separation on the second manganese sulfate concentrated liquid in a temperature range of 50° C. or more to acquire third manganese sulfate filtrated liquid and solid-state first manganese sulfate hydrate;

(h) cleaning the first manganese sulfate hydrate at a temperature range of 50° C. or more by using high-purity manganese sulfate saturated solution and, after that, performing fourth solid liquid separation to acquire fourth manganese sulfate filtrated liquid and solid-state second manganese sulfate hydrate; and (i) drying the second manganese sulfate hydrate to acquire the high-purity manganese sulfate.

In the invention, a term "manganese sulfate waste liquid of a wasted battery" denotes waste liquid or the like containing manganese sulfate generated in a process of recovering cobalt and nickel from a fine-grain cathode material obtained by breaking and sieving the wasted battery. The waste liquid may contain sulfates such as manganese sulfate ($MnSO_4$), copper sulfate ($CuSO_4$), aluminum sulfate ($Al_2(SO_4)_3$), cobalt sulfate ($CoSO_4$), nickel sulfate ($NiSO_4$), zinc sulfate ($ZnSO_4$), calcium sulfate ($CaSO_4$), or sodium sulfate ($Na_2SO_4$) generated in a reaction between constituents of the wasted battery and sulfuric acid and organic materials, and the waste liquid may contain manganese ions ($Mn^+$), copper ions ($Cu^+$), aluminum ions ($Al^+$), cobalt ions ($Co^+$), nickel ions ($Ni^+$), calcium ions ($Ca^+$), sodium ions ($Na^+$), or lithium ions ($Li^+$). However, the invention is not limited thereto.

Hereinafter, the steps of the method of manufacturing high-purity manganese sulfate from manganese sulfate waste liquid of the wasted battery will be described in detail.

Step (a): Producing Manganese Sulfate Waste Liquid from which an Organic Materials is Removed by Allowing the Manganese Sulfate Waste Liquid Generated in a Recycling Process of the Wasted Battery to Pass Through Active Carbon According to the embodiment, the manganese sulfate waste liquid of the wasted battery is allowed to pass through active carbon, so that organic materials are removed. The active carbon has an effect of adsorbing the organic materials existing in the manganese sulfate waste liquid to remove the organic materials. The absorbability of the active carbon with respect to an organic material is inversely proportional to a molecular weight of the organic material and pH of inflow water. The organic materials existing in the manganese sulfate waste liquid has a small molecular weight, and the pH of the manganese sulfate waste liquid is maintained to be in a range of 0.5 to 1 due to sulfuric acid. The active carbon is very effective to removing the organic materials existing in the manganese sulfate waste liquid. Any active carbon capable of reducing a total amount (TOC, Total Organic Carbon) of the organic materials existing in the manganese sulfate waste liquid down to 20 ppm or less may be used without limitation to the type or the adsorption method thereof.

According to the embodiment, in the manganese sulfate waste liquid from which organic materials are removed in the step (b), a concentration of organic materials is in a range of 0 to 20 ppm; a content of manganese is in a range of 6 to 10 wt %; and pH is in a range of 0.2 to 2. Preferably, in the organic-material-removed manganese sulfate waste liquid, the concentration of organic materials is in a range of 0 to 10 ppm; the content of manganese is 8 wt %; and pH is in a range of 0.5 to 1. The content of manganese denotes the content of manganese (Mn) existing in the manganese sulfate waste liquid irrespective of the state of manganese, for example, manganese sulfide, manganese sulfate, or manganese ion.

Step (b): Adjusting pH of the Organic-material-removed Manganese Sulfate Waste Liquid to be in a Range of 4 to 7

If a sulfide precipitating agent is added to the organic-material-removed manganese sulfate waste liquid and the pH thereof is adjusted, copper, cobalt, nickel, zinc, and the like existing in the waste liquid can be precipitated as sulfides thereof, and aluminum can be precipitated as a hydroxide thereof.

According to the embodiment, the pH of the manganese sulfate waste liquid from which organic materials are removed in the step (b) is adjusted to be in a range of 4 to 7 by using manganese oxide (MnO) or barium hydroxide ($Ba(OH)_2$), and a sulfide such as manganese sulfide (MnS) or barium sulfide (BaS) is used for a pH adjusting and manganese sulfate precipitating agent. Hereinafter, a method of adjusting the pH of the organic-material-removed manganese sulfate waste liquid and precipitating sulfides by using the aforementioned manganese oxide (MnO), manganese sulfide (MnS), barium sulfide (BaS), or barium hydroxide ($Ba(OH)_2$) will be described in detail.

Step (b-1): Adding Manganese Oxide (MnO) to Adjust pH to be 2

First, the pH of the organic-material-removed manganese sulfate waste liquid is measured, and if the pH is 2 or less, the manganese oxide (MnO) is added to adjust the pH of the manganese sulfate waste liquid to be 2. As the manganese oxide, 10 to 20% of manganese oxide slurry can be used.

Step (b-2): Adding Manganese Sulfide (MnS) to Precipitate Sulfides

First, the manganese sulfide is added to the manganese sulfate waste liquid of which pH is adjusted to be 2, and after that, stirring is performed for 30 minutes or more to form sulfide precipitate. The manganese sulfide is added to the manganese sulfate waste liquid with 0.6 to 1 molar equivalents with respect to the molar equivalent of total ions including nickel ions ($Ni^+$), cobalt ions ($Co^+$), or copper ions ($Cu^+$) existing in the manganese sulfate waste liquid. Preferably, the manganese sulfide is added with 0.8 molar equivalents with respect to the molar equivalent of total ions including nickel ions ($Ni^+$), cobalt ions ($Co^+$), or copper ions ($Cu^+$) existing in the manganese sulfate waste liquid. As the manganese sulfide, 10 to 20% of manganese sulfide slurry may be used.

Step (b-3): Adding Barium Sulfide (BaS)

The barium sulfide (BaS) is added to the manganese sulfate waste liquid of which pH is adjusted to be 2 with 0.1 to 0.7 molar equivalents with respect to the molar equivalent of total ions including nickel ions ($Ni^+$), cobalt ions ($Co^+$), or copper ions (Cul existing in the manganese sulfate waste liquid. Preferably, the barium sulfide is added with 0.3 molar equivalents with respect to the molar equivalent of total ions including nickel ions ($Ni^+$), cobalt ions ($Co^+$), or copper ions (Cul existing in the manganese sulfate waste liquid.

Instead of the barium sulfide, sodium sulfide, potassium sulfide, lithium sulfide, calcium sulfide, strontium sulfide, or the like may be used. However, since impurities are added, there is a difficulty in refining.

Step (b-4): Adding Barium Hydroxide ($Ba(OH)_2$) to Adjust pH to be in a Range of 4 to 7

The barium hydroxide is added to the manganese sulfate waste liquid added with the barium sulfide to adjust the pH of the manganese sulfate waste liquid to be in a range of 4 to 7. Preferably, the pH is adjusted to be in a range of 5 to 6. Instead of the barium hydroxide, an alkali material such as manganese hydroxide ($Mn(OH)_2$), manganese carbonate ($MnCO_3$), or calcium hydroxide may be used. The manganese hydroxide has problems of difficulty in storing and handling. The manganese carbonate is easy to store and handle, but it has a problem of a low reaction rate. Other alkali materials have a problem of accompanying impurities. However, with respect to the barium hydroxide, since barium is precipitated and removed as barium sulfate which is not almost dissolved in water, impurities are not accompanied and the reaction rate is increased. Therefore, the barium hydroxide is most preferred.

According to the embodiment, the barium sulfide in the step (b) is added with 3 molar equivalents with respect to the molar equivalent of total ions including nickel ions ($Ni^+$), cobalt ions ($Co^+$), copper ions ($Cu^+$), or zinc ions ($Zn^+$)

existing in the manganese sulfate waste liquid. The total used amount of manganese sulfide and barium sulfide as sulfide precipitating agents is 1.0 to 1.5 molar equivalents with respect to the molar equivalent of total ions including nickel ions ($Ni^+$), cobalt ions ($Co^+$), copper ions ($Cu^+$), or zinc ions ($Zn^+$) existing in the manganese sulfate waste liquid.

When the pH adjustment step (b) is performed on the manganese sulfate waste liquid, in the manganese sulfate waste liquid, the copper ions, cobalt ions, nickel ions, and zinc ions are precipitated as copper sulfide (CuS), cobalt sulfide (CoS), nickel sulfide (NiS), and zinc sulfide (ZnS) by externally-supplied sulfide precipitating agent, and the aluminum ions are precipitated as aluminum hydroxide ($Al(OH)_3$). In the manganese sulfate filtrated liquid obtained by performing the solid liquid separation on the precipitates, only manganese sulfate and ions of alkali metals, for example, calcium ions ($Ca^{2+}$) and sodium ions ($Na^+$) remain in a liquid state.

According to specific embodiments, when the step (b) of pH adjustment for the manganese sulfate waste liquid is performed, the concentration of copper ions ($Cu^+$), aluminum ions ($Al^+$), cobalt ions ($Co^+$), and nickel ions ($Ni^+$) existing in a liquid state is 5 ppm or less. As a result, if the manganese oxide (MnO), manganese sulfide (MnS), barium sulfide (BaS), or barium hydroxide ($Ba(OH)_2$) is used in the step (b) of pH adjustment for the manganese sulfate waste liquid, there are advantages as follows. Namely, in the step of pH adjustment for the manganese sulfate waste liquid, the solubility of the manganese sulfate can be maintained, and other metal salts as impurities can be precipitated to be removed. In addition, secondary contamination can be prevented in order to produce high-purity manganese sulfate.

Step (c): Performing First Solid Liquid Separation on the Manganese Sulfate Waste Liquid Including Sulfide Precipitation and Hydroxide Precipitation Generated by Adding the Barium Sulfide and Adjusting pH to in a Range of 4 to 7 to Separate First Manganese Sulfate Filtrated Liquid and First Solid According to the embodiment, the first solid liquid separation is performed on the manganese sulfate waste liquid of which pH is adjusted to be in a range of 4 to 7 to separate the first manganese sulfate filtrated liquid and the first solid. The first manganese sulfate filtrated liquid includes manganese sulfate and alkali metals, for example, calcium or sodium which are not precipitated by the precipitating agent. The first solid includes copper sulfide (CuS), cobalt sulfide (CoS), nickel sulfide (NiS), zinc sulfide (ZnS), aluminum hydroxide ($Al(OH)_3$), or barium sulfate ($BaSO_4$) generated by adding the sulfide precipitating agent and the hydroxide precipitating agent.

Step (d): Performing First Evaporation Concentration of Heating the First Manganese Sulfate Filtrated Liquid to Evaporate Moisture to Produce First Manganese Sulfate Concentrated Liquid The step utilizes a common ion effect in order to remove calcium component included in the manganese sulfate filtrated liquid through precipitation.

According to the embodiment, the first evaporation concentration is performed on the first manganese sulfate filtrated liquid in a temperature range of 90 to 100° C. to produce the first manganese sulfate concentrated liquid. Preferably, the first evaporation concentration is performed on the first manganese sulfate filtrated liquid in a temperature range of 95 to 100° C. to produce the first manganese sulfate concentrated liquid. More preferably, the first evaporation concentration is performed on the first manganese sulfate filtrated liquid at a temperature of 100° C. to produce the first manganese sulfate concentrated liquid. The first evaporation concentration is a process of heating the first manganese sulfate filtrated liquid to evaporate moisture to concentrate the first manganese sulfate filtrated liquid. In the concentration process, as the temperature is increased, the solubility of the manganese sulfate hydrates ($MnSO_4.1H_2O$ or the like) is decreased. As the concentration process proceeds, the concentration of manganese ions ($Mn^{2+}$), calcium ions ($Ca^{2+}$), or sulfate ions ($SO_4^{2-}$) in the aqueous solution is increased, and manganese sulfate monohydrate is precipitated. In addition, due to influence of sulfate ions ($SO_4^{2-}$) as common ions, the solubility of the calcium sulfate becomes very low, and thus, the precipitate of the calcium sulfate hydrates ($CaSO_4.1/2H_2O$ or $CaSO_4.2H_2O$) is also generated.

According to the embodiment, in the first manganese sulfate concentrated liquid on which the first evaporation concentration is performed, the content of manganese is in a range of 11 to 15 wt % with respect to a total amount. Preferably, in the first manganese sulfate concentrated liquid on which the first evaporation concentration is performed, the content of manganese is 13 wt % with respect to the total amount. Typically, in the manganese sulfate waste liquid produced by dissolving a fine grain of the lithium battery in sulfuric acid, the content of manganese is in a range of 7 to 9% with respect to the total amount. Therefore, the first evaporation concentration may be performed for an appropriate time interval from the concentration in a temperature range of 90 to 100° C. until the content of manganese is in a range of 11 to 15% with respect to the total amount.

Step (e): Cooling the First Manganese Sulfate Concentrated Liquid Down to a Temperature Range of 40 to 60° C. and Performing Second Solid Liquid Separation to Separate Second Manganese Sulfate Filtrated Liquid and Second Solid In this step, by using a difference in solubility between the manganese sulfate hydrate and the calcium sulfate hydrate according to temperature, the manganese sulfate hydrate is allowed to be dissolved, and the calcium sulfate hydrate is allowed to remain in a solid state. Namely, with respect to the solubility of the manganese sulfate in pure water, the solubility at 100° C. is about Mn 9.5% (manganese sulfate monohydrate 29.2 g/aqueous solution 100 g), and the solubility at 40° C. is about Mn 14% (manganese sulfate monohydrate 43 g/aqueous solution 100 g). With respect to the solubility of the calcium sulfate 1/2 hydrate, the solubility at 100° C. is about 0.067 g/aqueous solution 100 g, and the solubility at 40° C. is about 0.201 g/aqueous solution 100. However, in case of the manganese sulfate concentrated liquid according to the invention, since main constituents of the aqueous solution is sulfate ions and manganese ions, the common ion effect does not almost occur in the solubility of the manganese sulfate, but the solubility of the calcium sulfate is decreased down to 1/100 or less.

According to the embodiment, the first manganese sulfate concentrated liquid is cooled down to a temperature range of 40 to 60° C., and second solid liquid separation is performed on the cooled first manganese sulfate concentrated liquid to separate second manganese sulfate filtrated liquid and second solid. Preferably, the first manganese sulfate concentrated liquid is cooled down to a temperature of 50° C., and the second solid liquid separation is performed on the cooled first manganese sulfate concentrated liquid to separate the second manganese sulfate filtrated liquid and the second solid. If the first manganese sulfate concentrated liquid is cooled down to a temperature of less than 40° C., manganese sulfate tetrahydrate ($MnSO_4 \cdot 4H_2O$), manganese sulfate pentahydrate ($MnSO_4 \cdot 5H_2O$), manganese sulfate heptahydrate ($MnSO_4 \cdot 7H_2O$), and the like are generated, and viscosity of the liquid is increased, so that the solid liquid separation may be difficult to achieve and the manufacturing yield of the manganese sulfate may be decreased. If the temperature is 60° C. or more, the solubility of the manganese sulfate monohydrate is low, and the manganese sulfate monohydrate is not dissolved. The amount of the manganese sulfate monohydrate discharged and discarded together with the calcium sulfate is increased, so that the yield of the manganese is decreased. The second manganese sulfate filtrated liquid obtained in the second solid liquid separation contains dissolved sulfate ions, manganese ions, sodium ions, a small amount of calcium ions, and the like, and the second solid contains extracted calcium sulfate hydrate existing in a solid state.

Step (f): Performing Second Evaporation Concentration on the Second Manganese Sulfate Filtrated Liquid in a Temperature Range of 90 to 100° C. to Produce Second Manganese Sulfate Concentrated Liquid According to the embodiment, the second evaporation concentration is performed on the second manganese sulfate filtrated liquid in a temperature range of 90 to 100° C. to produce the second manganese sulfate concentrated liquid. Preferably, the second evaporation concentration is performed on the second manganese sulfate filtrated liquid in a temperature range of 95 to 100° C. to produce the second manganese sulfate concentrated liquid. More preferably, the second evaporation concentration is performed on the second manganese sulfate filtrated liquid at a temperature of 100° C. to produce the second manganese sulfate concentrated liquid.

According to another specific embodiment, the second evaporation concentration is performed after sulfuric acid is added to the second manganese sulfate filtrated liquid so that the concentration is in a range of 0.5 to 2 g/L. Preferably, the second evaporation concentration is performed after sulfuric acid is added to the second manganese sulfate filtrated liquid so that the concentration is 1 g/L. The sulfuric acid added to the second manganese sulfate filtrated liquid is used in order to prevent manganese oxides from being generated in the second evaporation concentration process and to prevent the manganese sulfate hydrate from being commonly precipitated together with the calcium sulfate hydrate.

The second evaporation concentration is a process of concentrating the second manganese sulfate filtrated liquid by heating the second manganese sulfate filtrated liquid to evaporate moisture. Preferably, the concentration temperature does not exceed 100° C.

According to the embodiment, the content of manganese in the second manganese sulfate concentrated liquid is in a range of 14 to 28 wt %. Preferably, the content of manganese in the second manganese sulfate concentrated liquid is 16.7 wt %. The content of manganese in the second manganese sulfate filtrated liquid produced through the first evaporation concentration is in a range of 11 to 15 wt %. Therefore, the second evaporation concentration may be performed for an appropriate time interval from the concentration in a temperature range of 90 to 100° C. until the content of manganese in the second manganese sulfate concentrated liquid is in a range of 14 to 28 wt %. If the second evaporation concentration is performed on the second manganese sulfate concentrated liquid, slurry may be generated. The slurry is generated as the generated amount of the manganese sulfate hydrate as solid is increased. If the slurry is obtained and dried through the later-described third solid liquid separation, the high-purity manganese sulfate is obtained.

Step (g): Performing Third Solid Liquid Separation on the Second Manganese Sulfate Concentrated Liquid in a Temperature Range of 50° C. or More to Acquire Third Manganese Sulfate Filtrated Liquid and Solid-state First Manganese Sulfate Hydrate According to the embodiment, the third solid liquid separation is performed on the second manganese sulfate concentrated liquid to obtain the third manganese sulfate filtrated liquid and the first manganese sulfate hydrate. Preferably, the third solid liquid separation is performed so that the second manganese sulfate concentrated liquid is not cooled down to 50° C. or less to obtain the third manganese sulfate filtrated liquid and the first manganese sulfate hydrate. More preferably, the third solid liquid separation is performed so that the second manganese sulfate concentrated liquid is not cooled down to 80° C. or less to obtain the third manganese sulfate filtrated liquid and the first manganese sulfate hydrate.

If the temperature of the concentrated liquid is 50° C. or less at the time of filtering, the solubility of the manganese sulfate monohydrate is increased, and thus, the amount of the manganese discharged in the filtrated liquid is increased, so that the yield of the manganese is decreased.

In addition, due to the increase in viscosity, the amount of the solution containing the manganese sulfate hydrate as solid is increased, and impurities in the solution are increased. Therefore, the purity of the product is decreased, and the size of grains of the dried powder of the product becomes non-uniform. The manganese sulfate hydrate dissolved in the solution may exist in the third manganese sulfate filtrated liquid. Therefore, the third manganese sulfate filtrated liquid may be used for the manganese sulfate recovering process in order to recover the manganese sulfate hydrate dissolved in the solution. The manganese sulfate recovering process will be described below.

Step (h): Cleaning the First Manganese Sulfate Hydrate at a Temperature Range of 50° C. or More by Using High-purity Manganese Sulfate Saturated Solution of 50° C. or More and, after that, Performing Fourth Solid Liquid Separation to Acquire Fourth Manganese Sulfate Filtrated Liquid and Solid-state Second Manganese Sulfate Hydrate According to the embodiment, the first manganese sulfate hydrate is maintained at a temperature of 50° C. or more, and after the first manganese sulfate hydrate is cleaned by using a pure manganese sulfate saturated solution (concentration of total impurities is 50 ppm or less) of 50° C. or more, the fourth solid liquid separation is performed to obtain the fourth manganese sulfate filtrated liquid and the second manganese sulfate hydrate. Since a manganese sulfate saturated solution and manganese sulfate hydrate dissolved in the solution may exist in the fourth manganese sulfate filtrated liquid, the steps (d) to (h) may be performed again by using the fourth manganese sulfate filtrated liquid to further obtain the manganese sulfate.

Step (i): Drying the Second Manganese Sulfate Hydrate to Acquire the High-purity Manganese Sulfate According to the embodiment, the second manganese sulfate hydrate is dried to obtain the high-purity manganese sulfate. The high-purity manganese sulfate is as pure as the high-purity manganese sulfate can be immediately used to produce the cathode materials for the lithium ion secondary battery.

In the invention, the process of obtaining the high-purity manganese sulfate is performed by adjusting the solubility of the sulfates. Therefore, if the manganese sulfate hydrate recovering process is additionally performed on the solution discarded after the extraction of the manganese sulfate hydrate, the manganese sulfate can be further produced.

According to another specific embodiment, performed is a manganese recovering process of repeatedly performing the step (d) to (g) on the third manganese sulfate filtrated liquid obtained in the step (g) to further obtain the aqueous solution of manganese and the solid-state manganese sulfate hydrate. The manganese recovering process may be repeatedly performed until the manganese sulfate hydrate does no longer exist in the aqueous solution of manganese.

According to another embodiment of the invention, the solid-state manganese sulfate hydrate additionally obtained through the manganese recovering process together with the fourth manganese sulfate filtrated liquid is mixed with the first manganese sulfate filtrated liquid, and the first evaporation concentration is performed. Although a large amount of metal is removed from the aqueous solution of manganese produced through the manganese recovering process, the aqueous solution of manganese may be too high in content of manganese ions to be discharged as treated waste water. In the invention, an additional waste water treatment process may be performed in order to remove the manganese ions existing in the aqueous solution of manganese and discharge the aqueous solution of manganese as treated clean waste water.

According to the embodiment, further provided is a waste water treatment process of adding a pH adjusting agent having an alkali property to the aqueous solution of manganese obtained through the manganese recovering process to adjust the pH to be in a range of 5 to 9, adding the barium sulfide (BaS) with a concentration of 1 to 1.4 times the concentration of manganese to extract the manganese sulfide (MnS) and the barium sulfate, and performing a solid liquid separation to obtain the solid-state manganese sulfide and the manganese sulfate. Preferably, further provided is a waste water treatment process of adding the barium sulfide with a concentration of 1.0 times the concentration of manganese to the aqueous solution of manganese obtained through the manganese recovering process to extract the manganese sulfide (MnS) and performing the solid liquid separation to obtain the solid-state manganese sulfide. The barium sulfide supplies sulfur ions to the aqueous solution of manganese, so that the manganese ions are extracted as the manganese sulfide. At the same time, since the barium ions are also extracted as refractory barium sulfate, if the solid liquid separation is performed on the aqueous solution of manganese added with the barium sulfide, clean waste water which can be immediately discharged can be obtained.

According to the embodiment, the manganese sulfide obtained through the waste water treatment process may be used as a sulfide precipitating agent used for pH adjustment in the step (b).

The features and advantages of the invention can be summarized as follows.

(i) The invention relates to a method of manufacturing high-purity, high-quality manganese sulfate which can be immediately used for producing cathode materials for a lithium ion secondary battery from manganese sulfate waste liquid of a wasted battery.

(ii) Since impurities are removed from the manganese sulfate waste liquid by using sulfides causing no secondary contamination in the manganese sulfate waste liquid and the manganese sulfate is manufactured by performing evaporation concentration through heating, the manufacturing method according to the invention is very environment-friendly and economical.

(iii) Since the manganese recovering process improving the manufacturing yield of the manganese sulfate and the waste water treatment process capable of recycling the source materials and discharging waste water are integrated, the manufacturing method according to the invention is very efficient and environment-friendly.

(iv) Since high-purity manganese sulfate is manufactured from the manganese sulfate waste liquid discarded in the wasted battery recycling process at a low cost, the manufacturing method according to the invention is applied to the recycling industry, and thus, it is possible to obtain effects of preventing environmental pollution and facilitating recycling the resources.

The invention relates to method of manufacturing high-purity, high-quality manganese sulfate which can be immediately used for manufacturing a lithium ion secondary battery from manganese sulfate waste liquid of a wasted battery. In the manufacturing method according to the invention, since impurities are removed from the manganese sulfate waste liquid by using materials such as barium sulfide, manganese oxide, and barium hydroxide causing no secondary contamination in the manganese sulfate waste liquid and the manganese sulfate is manufactured by performing evaporation concentration through heating, the manufacturing method is very environment-friendly and economical. In addition, since the manganese recovering process improving the manufacturing yield of the manganese sulfate and the waste water treatment process capable of recycling the source materials and discharging waste water are integrated, the manufacturing method is very efficient and environment-friendly. The manufacturing method according to the invention is applied to the recycling industry, and thus, it is possible to prevent environmental pollution and facilitate recycling the resources.

DETAILED DESCRIPTION

EXAMPLE

1. Manufacturing of High-Purity Manganese Sulfate

Figure 1:
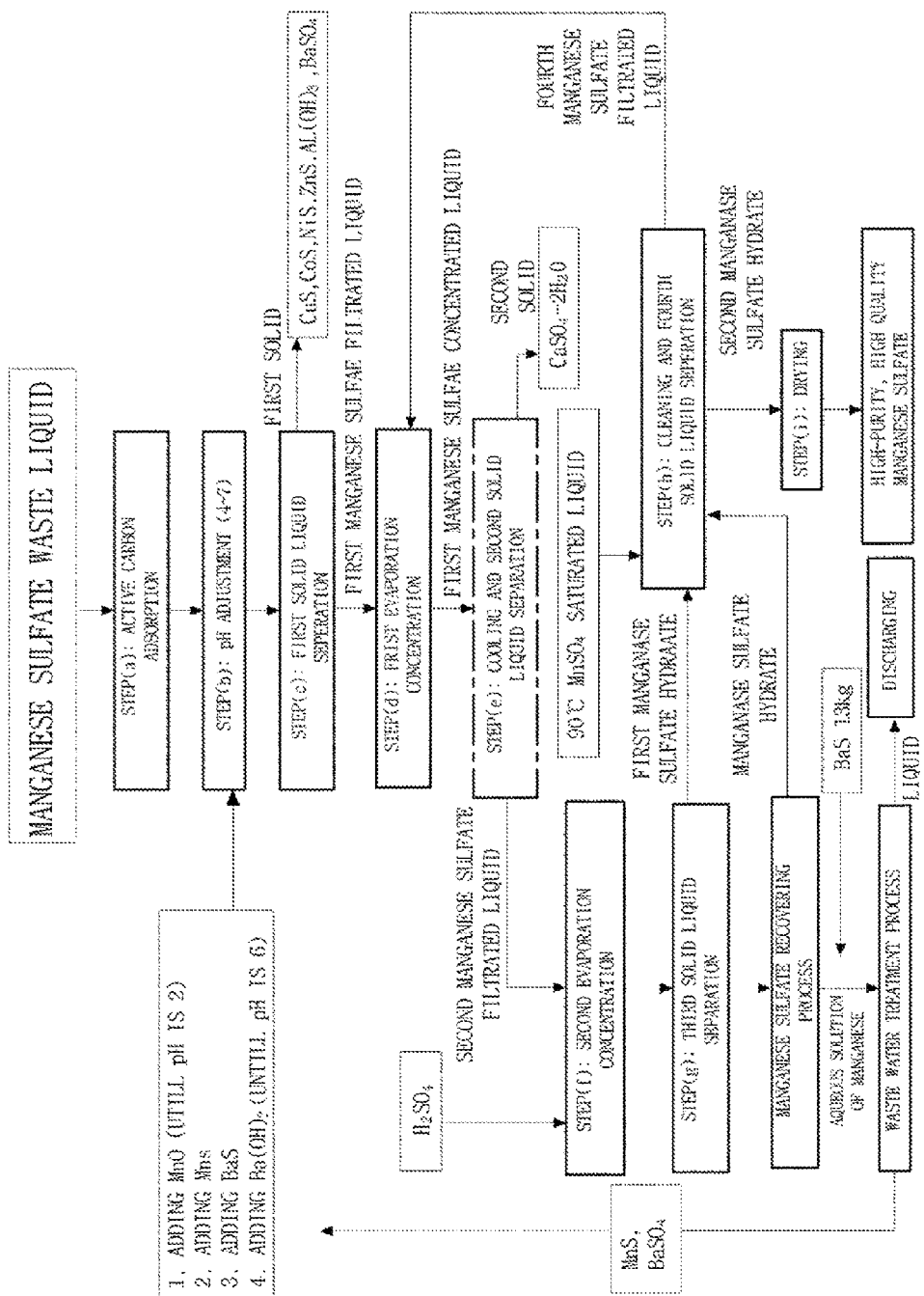
FIG. 1 is a diagram illustrating a series of processes of manufacturing high-purity, high-quality manganese sulfate from a manganese sulfate waste liquid generated in a lithium ion secondary battery recycling process.

1) Producing Organic-Material-Removed Manganese Sulfate Waste Liquid

First, 1 ton of manganese sulfate waste liquid obtained in recycling of lithium ion secondary batteries was prepared. The pH of the prepared manganese sulfate waste liquid is 1, and the composition thereof is listed in Table 1. The 1 ton of manganese sulfate waste liquid was allowed to pass through an active carbon adsorption tower to remove organic materials. As listed in Table 1, a total amount of organic materials contained in the 1 ton of manganese sulfate waste liquid is 130 ppm. After the 1 ton of manganese sulfate waste liquid passed through the active carbon adsorption tower, a total amount (total organic carbon, TOC) of organic material was measured. As a result, it was observed that the content of organic materials was 20 ppm or less.

TABLE 1

| Composition | Concentration |
|---|---|
| manganese (Mn) | 7.9 wt % with respect to Total Waste Liquid |
| copper (Cu) | 2011.4 ppm |
| aluminum(Al) | 152.7 ppm |
| cobalt (Co) | 407.3 ppm |
| nickel (Ni) | 16.5 ppm |
| zinc (Zn) | 183.9 ppm |
| calcium (Ca) | 212.2 ppm |
| sodium (Na) | 6.9 ppm |
| organic materials | 130 ppm |

2) Removing Copper (Cu), Aluminum (Al), Cobalt (Co), Nickel (Ni), and Zinc (Zn)

In order to remove copper (Cu), aluminum (Al), cobalt (Co), nickel (Ni), and zinc (Zn) existing in the manganese sulfate waste liquid, the manganese sulfate waste liquid was neutralized by using manganese sulfide (MnO), manganese sulfide (MnS), barium sulfide (BaS), and barium hydroxide (Ba(OH)$_2$). In order to adjust the pH of the manganese sulfate waste liquid from which the organic materials are removed at a level of 10 ppm or less to be 6, manganese oxide slurry, manganese sulfide slurry, aqueous solution of barium sulfide, and barium hydroxide slurry were produced. The manganese oxide slurry was produced by mixing 6.4 kg of manganese oxide and 25.6 kg of water, and the manganese sulfide slurry was produced by axing 7 kg of manganese sulfide and 28 kg of water. The aqueous solution of barium sulfide was produced by mixing 6.8 kg of barium sulfide and 33 kg of water, and the barium hydroxide slurry was produced by mixing 17 kg of barium hydroxide and 8 kg of water. The produced manganese oxide slurry was added to the organic-material-removed manganese sulfate waste liquid to adjust the pH of the manganese sulfate waste liquid to be 2. With respect to the manganese oxide, if 10 wt % or more of manganese exists in the solution or if the pH of the solution is 2 or more, the reaction rate is decreased, so that a long time is taken for the reaction, and a sludge of unreacted materials is formed. Therefore, there are problems of increase in consumption of source materials and in cost of waste material treatment. The produced manganese sulfide slurry was added to the manganese sulfate waste liquid of which pH is adjusted to be 2. The added amount of the manganese sulfide is 0.8 molar equivalents with respect to the molar equivalent of total ions including nickel ions (Ni$^+$), cobalt ions (Co$^+$), or copper ions (Cu$^+$) existing in the manganese sulfate waste liquid. The manganese sulfate waste liquid added with the manganese sulfite slurry was stirred for 30 minutes, and after a sufficient reaction was performed, the aqueous solution of barium sulfide was added. The added amount of the barium sulfide is 0.7 molar equivalents with respect to the molar equivalent of total ions including nickel ions (Ni$^+$), cobalt ions (Co$^+$), or copper ions (Cu$^+$) existing in the manganese sulfate waste liquid. The produced barium hydroxide was added to the manganese sulfate waste liquid added with the aqueous solution of barium sulfide to adjust the pH of the manganese sulfate waste liquid to be 6. The manganese sulfate waste liquid of which pH was neutralized to be 6 was filtered to separate the filtrated liquid (first manganese sulfate filtrated liquid) and the precipitate (first solid). It was observed that sulfides, aluminum hydroxide, barium sulfate, and manganese sulfide existed in the precipitate separated through the filtering. The result of analysis of constituents of the precipitate and contents thereof is listed in Table 2.

TABLE 2

| Precipitate | | Weight |
|---|---|---|
| sulfide | copper sulfide (CuS) | 4.5 kg |
| | cobalt sulfide (CoS) | 1.6 kg |
| | nickel sulfide (NiS) | 0.8 kg |
| | zinc sulfide (ZnS) | 0.8 kg |
| | manganese sulfide (MnS) | 3.5 kg |
| aluminum hydroxide (Al(OH)$_3$) | | 2.0 kg |
| barium sulfate (BaSO$_4$) | | 32 kg |

3) Removing Calcium (Ca) through First Evaporation Concentration and Solid Liquid Separation The evaporation concentration was performed on the filtrated liquid from which impurities were removed through the neutralization process and the filtering process, and the cooling was performed. The filtering was performed to remove the calcium. The evaporation concentration was performed until the content of manganese was 13 wt % with respect to the filtrated liquid and the weight of the solution was 925 kg by heating the filtrated liquid to evaporate the moisture at a temperature range of 90 to 100° C. When the content of manganese was 13 wt % and the weight of the solution was 925 kg through the evaporation concentration, the concentration was stopped, and the concentrated filtrated liquid was gradually cooled down to a temperature of 50° C. After that, the filtering was performed to separate the filtrated liquid (first manganese sulfate concentrated liquid) and the precipitate (second solid). If the filtrated liquid on which the evaporation concentration is performed is cooled down to a temperature of 50° C., the solubility of the manganese sulfate hydrate is increased, but the solubility of the calcium sulfate hydrate is decreased. Therefore, it is possible to obtain the effect capable of performing the solid liquid separation on the manganese sulfate hydrate and the calcium sulfate hydrate. In addition, if the filtrated liquid on which the evaporation concentration is performed is cooled down to a temperature of 50° C. or less, the viscosity of the manganese sulfate hydrate is increased, so that it is difficult to perform the filtering. Therefore, the most preferable cooling temperature is 50° C. at which a maximum amount of the calcium sulfate hydrate is precipitated and the viscosity of the manganese sulfate hydrate is not increased. It was observed that the filtrated liquid was configured to mainly the dissolved manganese sulfate hydrate and manganese ions, and it was observed that the precipitate was configured to include about 430 g of calcium sulfate hydrate and about 430 g of manganese sulfate hydrate.

4) Extracting Manganese Sulfate Hydrate through Second Evaporation Concentration and Solid Liquid Separation 0.5 kg of sulfuric acid was added to the filtrated liquid (second manganese sulfate filtrated liquid) obtained through the first evaporation concentration and the solid liquid separation to adjust the pH of the filtrated liquid to be 2, and the filtrated liquid of which pH was adjusted was heated to perform the second evaporation concentration at a temperature range of 90 to 100° C. The second evaporation concentration process is a process of extracting the manganese sulfate hydrate. Particularly, the manganese ions existing in the filtrated liquid generate the best-quality manganese sulfate hydrate crystal at a pH range of 1 to 3. Therefore, in the invention, the sulfuric acid was added to the filtrated liquid to adjust the pH to be 2. The periodically added sulfuric acid has effects of preventing manganese oxides from being generated and preventing remaining calcium from being commonly precipitated together with the manganese sulfate hydrate. The second evaporation concentration was performed to concentrate the filtrated liquid by heating the filtrated liquid to evaporate moisture in a temperature range of 90 to 100° C. so that the concentration of the manganese sulfate slurry was 32 wt %, namely, the content of manganese was 16.7 wt %, and the weight of the filtrated liquid was 720 kg. The concentrated liquid (second manganese sulfate concentrated liquid) generated through the second evaporation concentration was cooled down to a temperature of 50° C., and the filtering is performed to separate the extracted manganese sulfate hydrate (first manganese sulfate hydrate) and the filtrated liquid (third manganese sulfate filtrated liquid). The content of moisture in the extracted manganese sulfate hydrate was 20%, and a total of 289 kg of manganese sulfate hydrate was obtained.

5) Manufacturing High-Purity Manganese Sulfate Through Cleaning Using Manganese Sulfate Saturated Solution, Filtering, and Drying The extracted manganese sulfate hydrate contains a small amount of calcium and sodium. In order to manufacture high-purity manganese sulfate by removing the calcium and sodium, cleaning was performed by using high-purity manganese sulfate saturated solution, and after that, filtering was performed to obtain solid-state high-purity manganese sulfate (second manganese sulfate hydrate). In the cleaning process, 100 kg of manganese sulfate saturated solution where the content of manganese was 11 wt % with respect to a total amount of the solution was used. The cleaning process was performed in the state where the temperature of solution was increased up to 90° C. The high-purity manganese sulfate hydrate obtained through the filtering was dried to manufacture 231 kg of high-purity manganese sulfate.

6) Improving Manufacturing Yield of Manganese Sulfate Through Manganese Sulfate Recovering Process The filtrated liquid (third manganese sulfate filtrated liquid) separated through the second evaporation concentration and the filtering process includes a large amount of the manganese ions and the dissolved-state manganese sulfate hydrate. Therefore, if the first evaporation concentration, the second evaporation concentration, and the filtering process are repeatedly performed on the filtrated liquid, it is possible to improve the manufacturing yield of the manganese sulfate hydrate. It was observed from the result of analysis of the content of manganese sulfate hydrate with respect to the filtrated liquid that about 27% of manganese sulfate hydrate contained in the before-filtering concentrated liquid was not extracted but remained in the filtrated liquid. In order to extract the manganese sulfate hydrate which was not extracted but remained in the filtrated liquid, the evaporation concentration and the filtering process were performed on the filtrated liquid. As a result of the manganese sulfate recovering process, a total of 109 kg of manganese sulfate hydrate was recovered, and the content of moisture in the recovered manganese sulfate hydrate was 20%. The recovered manganese sulfate hydrate together with the fourth manganese sulfate filtrated liquid is mixed with the first manganese sulfate filtrated liquid to be supplied to the first evaporation concentration process.

7) Waste Water Treatment Process Through Manganese Recovering

If the manganese sulfate recovering process is performed, the aqueous solution of manganese containing the manganese ions is separated. Since a high concentration of manganese exists in the aqueous solution of manganese, the waste water treatment process of removing the manganese ions for discharging needs to be performed. Therefore, the barium sulfide corresponding to 1 or 2 times the content of manganese was added to the aqueous solution of manganese to extract the manganese ions as the manganese sulfide (MnS). It was observed from the result of measurement of the content of manganese existing in the aqueous solution of manganese that the concentration of manganese was 10%, and a total weight of waste liquid was 43 kg. Therefore, it was observed that 10 kg of manganese was contained. 13.2 kg of barium sulfide corresponding to the molar equivalent of the manganese was added. The aqueous solution of manganese added with the barium sulfide was mixed well, and after that, the filtering process was performed, so that the solid liquid separation was obtained. It was observed from the result of component analysis with respect to the separated solid that 7 kg of manganese sulfide and 19 kg of barium sulfate were extracted. It was observed from the result of determination as to whether or not to contain the manganese ions that the liquid separated through the solid liquid separation was in a clean state that the liquid was able to be immediately discharged. The manganese sulfide extracted in the waste water treatment process was used again in the pH adjustment step of the organic-material-removed manganese sulfate waste liquid.

2. Result of Quality Evaluation of Manganese Sulfate

Component analysis on the manufactured manganese sulfate was performed by using inductively coupled plasma atomic emission spectroscopy (ICP-AES). It was observed from the result of analysis that, with respect to the manganese sulfate manufactured by the manufacturing method according to the invention, the content of manganese was 32.5 wt %, the content of copper was 2 ppm, the content of aluminum was 0.0 ppm, the content of cobalt was 2.2 ppm, the content of nickel was 0.0 ppm, the content of zinc was 1 ppm, the content of calcium was 45 ppm, the content of sodium was 7.8 ppm, and the content of organic materials was 0 ppm (refer to Table 3). In the result, the content of manganese is increased by 4 times in comparison with the manganese sulfate waste liquid, the content of copper is decreased by $1/2000$ times in comparison with the manganese sulfate waste liquid, the content of cobalt is decreased by $1/200$ times in comparison with the manganese sulfate waste liquid, the content of zinc is decreased by $1/183$ times in comparison with the manganese sulfate waste liquid, and the content of calcium is decreased by $1/5$ times in comparison with the manganese sulfate waste liquid. As a result, the pH adjustment step in the invention is very effective to remove copper, aluminum, cobalt, nickel, and zinc, and evaporation concentration process in the invention is very effective to remove calcium. In addition, whereas the content of manganese in the manganese sulfate waste liquid was 8 wt %, the content of manganese in the manganese sulfate in the invention was 32.5 wt % which was improved 4 times or more. This denotes that the manganese sulfate manufactured in the invention is high-purity, high-quality manganese sulfate which can be immediately used as the cathode material in manufacturing of lithium ion secondary batteries.

TABLE 3

| | Concentration | |
|---|---|---|
| Composition | Manganese Sulfate Waste Liquid (Source Liquid) | Manganese Sulfate |
| manganese (Mn) | 7.9 wt % with respect to Total Waste Liquid | 32.5 wt % with respect to Total Waste Liquid |
| copper (Cu) | 2011.4 ppm | 2.0 ppm |
| aluminum(Al) | 152.7 ppm | 0.0 ppm |
| cobalt (Co) | 407.3 ppm | 2.2 ppm |

TABLE 3-continued

| | Concentration | |
|---|---|---|
| Composition | Manganese Sulfate Waste Liquid (Source Liquid) | Manganese Sulfate |
| nickel (Ni) | 16.5 ppm | 0.0 ppm |
| zinc (Zn) | 183.9 ppm | 1.0 ppm |
| calcium (Ca) | 212.2 ppm | 45.0 ppm |
| sodium (Na) | 6.9 ppm | 7.8 ppm |
| organic materials | 130 ppm | 0.0 ppm |

While the present invention has been particularly shown and described with reference to exemplary embodiments thereof, it will be understood by those skilled in the art that various changes and modifications in form and details may be made therein without departing from the spirit and scope of the present invention as defined by the appended claims.

What is claimed is:

1. A method of manufacturing high-purity manganese sulfate from manganese sulfate waste liquid of a wasted battery generated in a wasted battery recycling process, comprising:
  (a) producing an organic-material-removed manganese sulfate waste liquid from which an organic material is removed by passing the manganese sulfate waste liquid generated in a recycling process of the wasted battery through active carbon;
  (b) adjusting pH of the organic-material-removed manganese sulfate waste liquid to 4 to 7 with manganese oxide (MnO), barium hydroxide ($Ba(OH)_2$), or a sulfide precipitating agent resulting in a pH-adjusted manganese sulfate waste liquid;
  (c) performing a first solid liquid separation on the pH-adjusted manganese sulfate waste liquid of step (b) to separate a first manganese sulfate filtrated liquid and a first solid;
  (d) performing a first evaporation concentration on the first manganese sulfate filtrated liquid at a temperature of 90 to 100° C. to produce a first manganese sulfate concentrated liquid;
  (e) cooling the first manganese sulfate concentrated liquid to a temperature of 40 to 60° C. and performing a second solid liquid separation to separate a second manganese sulfate filtrated liquid and a second solid;
  (f) performing a second evaporation concentration on the second manganese sulfate filtrated liquid at a temperature of 90 to 100° C. to produce a second manganese sulfate concentrated liquid;
  (g) performing a third solid liquid separation on the second manganese sulfate concentrated liquid at a temperature of 50° C. or more to acquire a third manganese sulfate filtrated liquid and a first solid-state manganese sulfate hydrate; and
  (h) cleaning the first manganese sulfate hydrate at a temperature of 50° C. or more with a high-purity manganese sulfate saturated solution and, after that, performing a fourth solid liquid separation to acquire a fourth manganese sulfate filtrated liquid and a second solid-state manganese sulfate hydrate; and
  (i) drying the second solid-state manganese sulfate hydrate to acquire the high-purity manganese sulfate.

2. The method according to claim 1, wherein, with respect to the manganese sulfate waste liquid from which organic materials are removed in the step (b), a concentration of organic materials is in a range of 0 to 20 ppm, a content of manganese is in a range of 6 to 10 wt %, and a pH thereof is in a range of 0.2 to 2.

3. The method according to claim 1, wherein the sulfide precipitating agent is manganese sulfide (MnS) or barium sulfide (BaS).

4. The method according to claim 1, wherein the sulfide precipitating agent used for the pH adjustment has 1.0 to 1.5 molar equivalents with respect to a molar equivalent of total ions including nickel ions ($Ni^+$), cobalt ions ($Co^+$), copper ions ($Cu^+$, and zinc ions ($Zn^{2+}$) existing in the manganese sulfate waste liquid.

5. The method according to claim 1, wherein, with respect to the first manganese sulfate concentrated liquid in the step (d), a content of manganese is in a range of 11 to 15 wt %.

6. The method according to claim 1, wherein only manganese sulfate hydrate is selectively dissolved in the first manganese sulfate concentrated liquid which is cooled a temperature of 40 to 60° C. in the step (e).

7. The method according to claim 1, wherein the second evaporation concentration in the step (f) is performed after sulfuric acid ($H_2SO_4$) is added to the second manganese sulfate filtrated liquid so that a concentration of the $H_2SO_4$ is 0.5 to 2 g/L.

8. The method according to claim 1, wherein, with respect to the second manganese sulfate concentrated liquid in the step (f), a content of manganese is 14 to 28 wt %.

9. The method according to claim 1, further comprising a manganese sulfate recovering process of repeatedly performing the steps (d) to (g) on the third manganese sulfate filtrated liquid obtained in the step (g) to additionally obtain an aqueous solution of manganese and a solid-state manganese sulfate hydrate.

10. A method of manufacturing high-purity manganese sulfate from manganese sulfate waste liquid of a wasted battery generated in a wasted battery recycling process, comprising:
  (a) producing an organic-material-removed manganese sulfate waste liquid from which an organic material is removed by passing the manganese sulfate waste liquid generated in a recycling process of the wasted battery through active carbon;
  (b) adjusting pH of the organic-material-removed manganese sulfate waste liquid to 4 to 7;
  (c) performing a first solid liquid separation on the manganese sulfate waste liquid of step (b) to separate a first manganese sulfate filtrated liquid and a first solid;
  (d) performing a first evaporation concentration on the first manganese sulfate filtrated liquid at a temperature of 90 to 100° C. to produce a first manganese sulfate concentrated liquid;
  (e) cooling the first manganese sulfate concentrated liquid to a temperature of 40 to 60° C. and performing a second solid liquid separation to separate a second manganese sulfate filtrated liquid and a second solid;
  (f) performing a second evaporation concentration on the second manganese sulfate filtrated liquid at a temperature of 90 to 100° C. to produce a second manganese sulfate concentrated liquid;
  (g) performing a third solid liquid separation on the second manganese sulfate concentrated liquid at a temperature of 50° C. or more to acquire a third manganese sulfate filtrated liquid and a first solid-state manganese sulfate hydrate;
  (h) cleaning the first manganese sulfate hydrate at a temperature of 50° C. or more with a high-purity manganese sulfate saturated solution and, after that, performing a fourth solid liquid separation to acquire a fourth manganese sulfate filtrated liquid and a second solid-state manganese sulfate hydrate;

(i) drying the second solid-state manganese sulfate hydrate to acquire the high-purity manganese sulfate; and (j) repeatedly performing steps (d) to (g) on the third manganese sulfate filtrated liquid obtained in step (g) to additionally obtain an aqueous solution of manganese and solid-state manganese sulfate hydrate;

wherein the solid-state manganese sulfate hydrate additionally obtained through the manganese sulfate recovering process together with the fourth manganese sulfate filtrated liquid generated in step (h) is mixed with the first manganese sulfate filtrated liquid, and the first evaporation concentration in step (d) is performed to additionally obtain the manganese sulfate.

11. A method of manufacturing high-purity manganese sulfate from manganese sulfate waste liquid of a wasted battery generated in a wasted battery recycling process, comprising:

(a) producing an organic-material-removed manganese sulfate waste liquid from which an organic material is removed by passing the manganese sulfate waste liquid generated in a recycling process of the wasted battery through active carbon;

(b) adjusting pH of the organic-material-removed manganese sulfate waste liquid to 4 to 7;

(c) performing a first solid liquid separation on the manganese sulfate waste liquid of step (b) to separate a first manganese sulfate filtrated liquid and a first solid;

(d) performing a first evaporation concentration on the first manganese sulfate filtrated liquid at a temperature of 90 to 100° C. to produce a first manganese sulfate concentrated liquid;

(e) cooling the first manganese sulfate concentrated liquid to a temperature of 40 to 60° C. and performing a second solid liquid separation to separate a second manganese sulfate filtrated liquid and a second solid;

(f) performing a second evaporation concentration on the second manganese sulfate filtrated liquid at a temperature of 90 to 100° C. to produce a second manganese sulfate concentrated liquid;

(g) performing a third solid liquid separation on the second manganese sulfate concentrated liquid at a temperature of 50° C. or more to acquire a third manganese sulfate filtrated liquid and a first solid-state manganese sulfate hydrate;

(h) cleaning the first manganese sulfate hydrate at a temperature of 50° C. or more with a high-purity manganese sulfate saturated solution and, after that, performing a fourth solid liquid separation to acquire a fourth manganese sulfate filtrated liquid and a second solid-state manganese sulfate hydrate;

(i) drying the second solid-state manganese sulfate hydrate to acquire the high-purity manganese sulfate; and (j) repeatedly performing steps (d) to (g) on the third manganese sulfate filtrated liquid obtained in step (g) to additionally obtain an aqueous solution of manganese and solid-state manganese sulfate hydrate; and (k) adding barium sulfide (BaS) having a concentration of 1 to 1.4 times the concentration of manganese to the waste liquid generated through the manganese sulfate recovering process and applying alkali to adjust the pH to of 5 to 9, extracting the manganese ions existing in the solution as manganese sulfide (MnS) or the like, performing solid liquid separation to obtain solid-state manganese sulfide, and reducing the concentration of manganese dissolved in the waste liquid to 10 ppm or less.

12. The method according to claim 11, wherein the manganese sulfide obtained through the waste water treatment process is used as a sulfide precipitating agent for adjusting the pH in the step (b).

* * * * *